May 8, 1962 K. S. FOREMAN 3,032,996
TWO-STAGE MASTER CYLINDER CONSTRUCTION
Filed Aug. 2, 1961
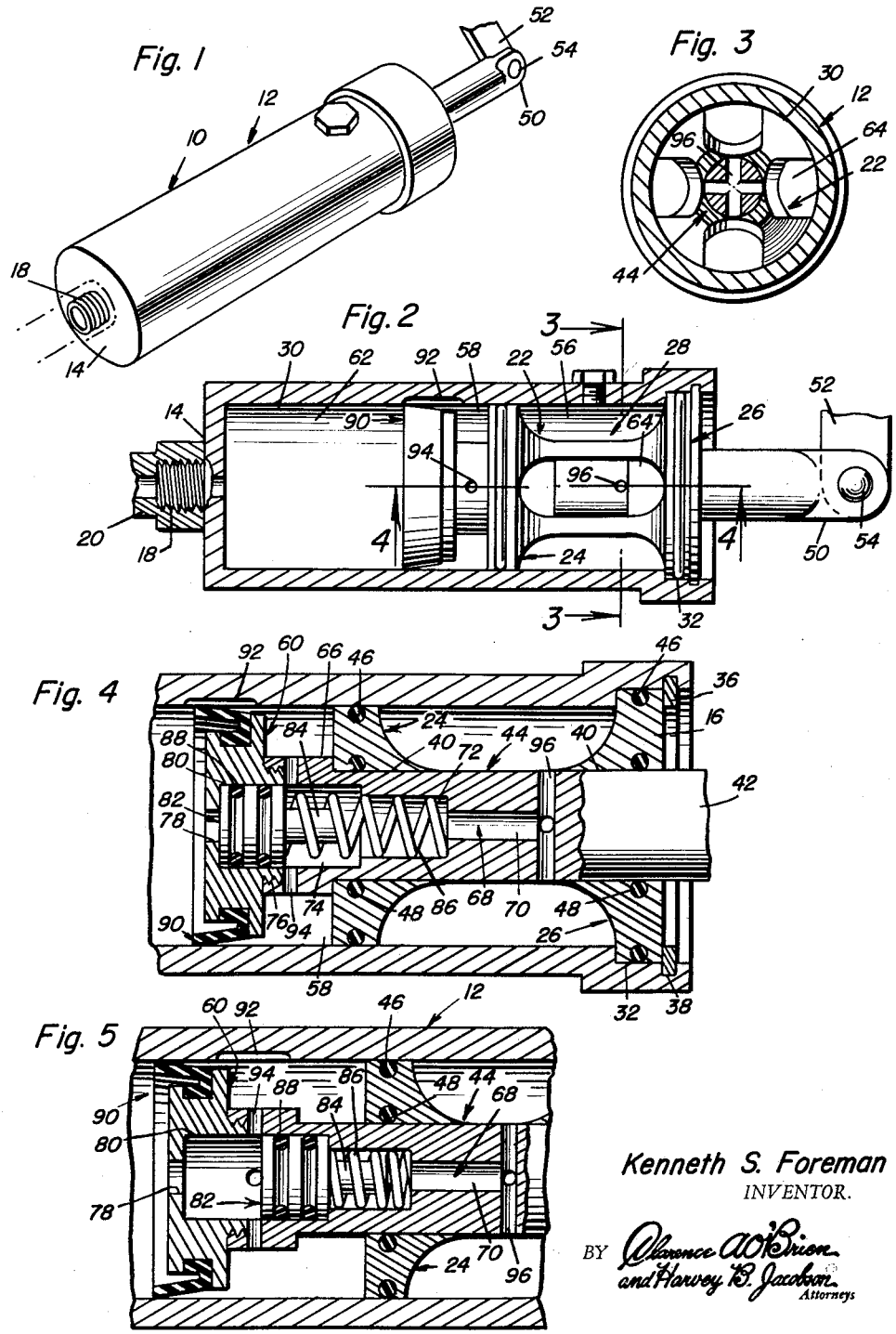
Kenneth S. Foreman
INVENTOR.

United States Patent Office 3,032,996
Patented May 8, 1962

3,032,996
TWO-STAGE MASTER CYLINDER
CONSTRUCTION
Kenneth S. Foreman, Bunker Hill, Ill.
Filed Aug. 2, 1961, Ser. No. 128,795
9 Claims. (Cl. 60—54.6)

This invention relates to a novel and useful two-stage master cylinder construction.

Although the master cylinder construction of the instant invention is specifically adapted for use with vehicle hydraulic brake systems, it is to be understood that it could be used as a fluid motor in any environment in which its particular operating features would be advantageous.

When depressing the brake pedal of a hydraulic brake system, the pistons of the wheel cylinders move an amount proportional to the amount the brake pedal is despressed. Accordingly, if the brakeshoes of the hydraulic brake system are in need of adjustment to compensate for wearing of the brake linings carried by the brakeshoes, the brake pedal has to be depressed a large proportion of its total travel before the brakeshoes of the hydraulic brake system are urged into contact with the brakedrums of the vehicle. Accordingly, it is the main object of this invention to provide a two-stage master cylinder construction which will enable initial movement of the brakeshoes into engagement with the brakedrums of the vehicle to be accomplished by a relatively small proportion of the total travel of the brake pedal of the hydraulic brake system. Then, upon engagement of the brakeshoes with the brakedrums, the master cylinder of the instant invention will be capable of normal operation and thus great mechanical leverage.

A further object of this invention, in accordance with the preceding object, is to provide a two-stage master cylinder construction which will compensate for expansion of the hydraulic brake fluid of a hydraulic brake system.

Still another object of this invention is to provide a two-stage master cylinder construction with pressure sensitive means for determining when the brakeshoes of a hydraulic brake system having been initially engaged with the brakedrums of the vehicle and for automatically changing the operation of the master cylinder from the first stage operation to the second stage operation upon the increase of fluid pressure within the hydraulic brake system.

A final object to be specifically enumerated herein is to provide a two-stage master cylinder construction in accordance with the preceding objects which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the master cylinder construction of the instant invention;

FIGURE 2 is a longitudinal vertical sectional view on somewhat of an enlarged scale taken substantially upon a plane passing through the longitudinal centerline of the master cylinder construction;

FIGURE 3 is a transverse vertical sectional view taken substantially upon the plane indicated by the section line 3—3 of FIGURE 2;

FIGURE 4 is an enlarged fragmentary sectional view taken substantially upon the plane indicated by the section line 4—4 of FIGURE 2; and FIGURE 5 is a longitudinal sectional view similar to that of FIGURE 4 but showing the piston member of the master cylinder in a different position from that illustrated in FIGURE 4.

Referring now more specifically to the drawings the numeral 10 generally designates the two-stage master cylinder construction of the instant invention. The master cylinder 10 includes a cylinder member referred to in general by the reference numeral 12 having a forward end wall 14 and a rear end wall 16. The forward end wall 14 is provided with an outlet neck 18 with which a hydraulic brake line 20 may be threadedly engaged.

A partition defining and abutment means generally referred to by the reference numeral 22 is provided and includes a pair of diametrically enlarged opposite end and centrally apertured head portions generally referred to by the reference numerals 24 and 26. The diametrically enlarged head portion 26 defines the rear end wall 16 and the head portions 22 and 24 are interconnected by means of a sleeve member generally referred to by the reference numeral 28. It will be noted that the cylinder member 12 has a longitudinal bore 30 formed therein which is provided with a counterbore 32 at the rear end of the cylinder member 12. The head portion 26 is larger in diameter than the head portion 24 and is seatingly secured in the counterbore 32 and is retained therein by means of a snap ring 36 seated in a groove 38 formed adjacent the rear end of the cylinder member 12.

Each of the head portions 24 and 26 is suitably apertured centrally as at 40 and the shank portion 42 of a piston member generally referred to by the reference numeral 46 is slidingly received through the apertures 40.

The head portions 24 and 26 are each provided with outer sealing rings 46 for sealing engagement with the internal surfaces of the bore 30 and the counterbore 32 and inner seals 48 for sealing engagement with the shank portion 42. The rear end of the shank portion 42 is provided with an apertured ear 50 which may be secured to the free end of an operating lever 52 by means of a pivot pin 54.

The partition defining abutment means 22 is maintained stationary within the cylinder member 12 and defines a fluid reservoir 56 between the head portions 24 and 26, an intermediate portion 58 between the head portion 24 and the diametrically enlarged head portion 60 secured to the forward end of the shank portion 42 and a forward portion 62 between the head portion 60 and the forward end wall 14.

From FIGURE 2 of the drawings it will be noted that the interconnecting sleeve member 28 is provided with a plurality of circumferentially spaced, radially opening and longitudinally extending slots 64 and from FIGURE 4 of the drawings it may be observed that the forward end of the shank portion 42 is provided with a diametrically enlarged portion 66 which establishes a retracted limit position for rearward movement of the shank portion 42 by engagement of the diametrically enlarged portion 66 with the forward face of the head portion 24.

The forward end of the shank portion 42 includes a longitudinal passage generally referred to by the reference numeral 66 which is defined by an inner blind bore 70, a first counterbore 72, a second counterbore 74 and a threaded counterbore 76.

The diametrically enlarged head portion 60 includes a centrally disposed bore 78 which also forms a portion of the longitudinal passage 68 and the bore 78 includes a counterbore 80 which is of the same diameter as the second counterbore 74. A piston valve member generally referred to by the reference numeral 82 is slidingly disposed in the counterbores 74 and 80 and includes a shank portion 84 about which the forward end of a compression spring 86 is disposed. The rear end of the compression spring 86 is seated in the inner end of the first counterbore 72 and the inner end of the second counterbore 74 defines a rearwardmost limit position of the piston valve member 82. It will be noted that the piston valve member 82 includes a plurality of sealing rings 88 for sealing engagement with the counterbores 74 and 80. The diametrically enlarged head portion 60 includes a sealing cup generally referred to by the reference numeral 90 for sealing engagement with the surfaces of the bore 30 and the bore 30 is provided with a longitudinal groove 92 which is positioned to communicate the intermediate portion 58 with the forward portion 62 when the diametrically enlarged head portion 60 is disposed in its rearmost retracted limit position with the diametrically enlarged portion 66 of the shank portion 42 disposed in abutting relation with the front face of the diametrically enlarged portion 24.

It will be noted that the sealing cup 90 will function to form a fluid tight seal between the diametrically enlarged head portion 60 and the bore 30 when the diametrically enlarged head portion 60 is being moved forwardly through the bore 30 and that upon rearward movement of the diametrically enlarged head portion 60 through the bore 30 that hydraulic fluid within the intermediate portion 58 may be bypassed by the diametrically enlarged head portion 60 and into the forward portion 62. Of course, when the diametrically enlarged head portion 60 is positioned as illustrated in FIGURE 4 of the drawings an excess of fluid pressure within the forward portion 62 caused by expansion of the hydraulic fluid due to an increase of temperature may be bypassed by the diametrically enlarged head portion 60 by means of the groove 92.

With attention again directed to FIGURES 4 and 5 of the drawings it will be noted that a forward transverse passage 94 is formed through the diametrically enlarged portion 66 and communicates the longitudinal passage means 68 with the intermediate portion 58 of the cylinder member 12. Additionally, a rear transverse passage 96 communicates the rear end of the longitudinal passage 68 with the fluid reservoir 56.

In operation, upon initial movement of the shank portion 42 forwardly, the compression spring 86 will have sufficient thrust to maintain the piston valve member 82 in the forwardmost closed position within the counterbore 80. Thus, the entire area of the forward face of the diametrically enlarged head portion 60 will act as a piston to force hydraulic fluid from the forward portion 62 of the cylinder 12 out through the outlet neck 18. Then, as the brakeshoes of the hydraulic brake system to which the master cylinder 10 is operatively connected are engaged with the brakedrums of the vehicle, pressure will be increased in the forward portion 62 of the cylinder member 12 whereupon the increase in pressure will effect rearward movement of the piston valve member 82 from the counterbore 72 into the counterbore 74 thus communicating the forward portion 62 of the cylinder member 12 with the intermediate portion 58. Then, continued forward movement of the shank portion 42 will in effect cause only the cross-sectional area of the diametrically enlarged portion 66 to force fluid from the forward portion 62 of the cylinder 12. As soon as the shank portion 42 is moved rearwardly, the piston valve member 82 will again move into the counterbore 80 whereupon the transverse passage 94 and longitudinal passage 68 will communicate the intermediate portion 58 with the fluid reservoir 56. In the event the hydraulic brake fluid within the hydraulic brake system with which the master cylinder 10 is operatively connected is caused to expand by an increase in temperature, the expansion of fluid communicated with the forward portion 62 of the cylinder 12 may be compensated for by the bypass of fluid past the diametrically enlarged portion 60 and the cup 90 by means of the groove 92.

Accordingly, it may be seen that herein described is a two-stage master cylinder construction which utilizes a minimum number of parts and is fully capable of functioning in a manner to effect initial movement of hydraulic brakeshoes into engagement with brakedrums with a small proportion of the total limit of travel of the brake pedal operatively connected to the master cylinder 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A two-stage master cylinder construction comprising a cylinder member having opposite end walls and provided with fluid outlet means at one end, a piston member including a diametrically enlarged head portion on one end of a shank portion reciprocal in said cylinder member, said shank portion extending outwardly of and slidably received through the other end wall of said cylinder member in sealed relation thereto, partition defining abutment means secured in said cylinder member intermediate the opposite ends thereof and defining an abutment defining a retracted limit position for movement of said head portion away from said one end wall with said head portion disposed between said one end wall and said partition defining member and spaced slightly from the latter and said partition defining member defining a fluid reservoir between said partition defining member and said other end wall of said cylinder member, said piston member including passage means communicating said one end of said cylinder member with the intermediate portion of said cylinder member disposed between said head portion and said partition defining member and said intermediate portion with said fluid reservoir having pressure responsive control valve means operable in response to increased pressure in said one end of said cylinder member for maintaining communication between said one end of said cylinder member and said intermediate portion thereof and terminating said last mentioned communication upon reduction of pressure in said one end of said cylinder member and establishing communication between said intermediate portion and said fluid reservoir, said head portion including sealing means operable for establishing a fluid tight seal between said head portion and said cylinder member upon movement of said head portion toward said one end wall and enabling fluid flow between said head portion and said cylinder member upon retraction of said head portion toward said retracted limit position.

2. A two-stage master cylinder construction comprising a cylinder member having opposite end walls and provided with fluid outlet means at one end, a piston member including a diametrically enlarged head portion on one end of a shank portion reciprocal in said cylinder member, said shank portion extending outwardly of and slidably received through the other end wall of said cylinder member in sealed relation thereto, partition defining abutment means secured in said cylinder member intermediate the opposite ends thereof and defining an abutment defining a retracted limit position for movement of said head portion away from said one end wall with said head portion disposed between said one end wall and said partition defining member and spaced slightly from the latter and said partition defining member defining a fluid reservoir between said partition defining member and said other end wall of said cylinder member, said piston member including passage means communicating said one end of said cylinder member with the intermediate portion of said cylinder member disposed between said head portion and said partition defining member and said intermediate portion with said fluid reservoir having pressure responsive control valve means operable in response to increased pressure in said one end of said cylinder member for maintaining communication between said one end of said cylinder member and said intermediate portion thereof and terminating said last mentioned communication upon reduction of pressure in said one end of said cylinder member and establishing communication between said intermediate portion and said fluid reservoir, said head portion including sealing means operable for establishing a fluid tight seal between said head portion and said cylinder member upon movement of said head portion toward said one end wall and enabling fluid flow between said head portion and said cylinder member upon retraction of said head portion toward said retracted limit position, said communication establishing means including a longitudinal passage opening through the forward free end face of said head portion and extending rearwardly through said shank portion to a point between said partition defining means and said end wall, front and rear transverse passage means in said shank portion intermediate said head portion and said partition defining means communicating said longitudinal passage with said intermediate portion and intermediate said partition defining means and said rear wall communicating said longitudinal passage with said reservoir, said pressure responsive control means comprising a piston type valve disposed in said longitudinal passage and movable between limit positions disposed forwardly and rearwardly of the juncture of said front transverse passage means and said longitudinal passage.

3. The combination of claim 2 including means normally resiliently urging said piston-type valve toward the forwardmost limit position.

4. The combination of claim 2 wherein said other end wall and said partition defining abutment means are integrally formed and comprise diametrically enlarged opposite end centrally apertured head portions carried by opposite ends of an interconnecting sleeve member, said sleeve member including longitudinally extending radial openings with which said rear transverse passage means are registered.

5. The combination of claim 4 wherein the rearmost of said apertured head portions is larger in diameter than the forwardmost apertured head portion, the rear end of said cylinder member having a counterbore, said rearmost apertured head portion seated and removably secured in said counterbore.

6. The combination of claim 1 wherein said cylinder member includes bypass means communicating said one end of said cylinder member with said intermediate portion of said cylinder member when said piston head portion is disposed in said retracted limit position.

7. The combination of claim 6 wherein said communication establishing means includes a longitudinal passage opening through the forward free end face of said head portion and extending rearwardly through said shank portion to a point between said partition defining means and said end wall, front and rear transverse passage means in said shank portion intermediate said head portion and said partition defining means communicating said longitudinal passage with said intermediate portion and intermediate said partition defining means and said rear wall communicating said longitudinal passage with said reservoir, said pressure responsive control means comprising a piston-type valve disposed in said longitudinal passage and movable between limit positions disposed forwardly and rearwardly of the juncture of said front transverse passage means and said longitudinal passage.

8. The combination of claim 7 including means normally resiliently urging said piston-type valve toward the forwardmost limit position.

9. The combination of claim 8 wherein said other end wall and said partition defining abutment means are integrally formed and comprise diametrically enlarged opposite end centrally apertured head portions carried by opposite ends of an interconnecting sleeve member, said sleeve member including longitudinally extending radial openings with which said rear transverse passage means are registered.

No references cited.